United States Patent [19]
Gehani et al.

[11] Patent Number: 5,918,009
[45] Date of Patent: Jun. 29, 1999

[54] TECHNIQUE FOR SHARING INFORMATION ON WORLD WIDE WEB

[75] Inventors: Narain H. Gehani, Summit; William D. Roome, Murray Hill, both of N.J.

[73] Assignee: Lucent Technologies Inc., Murray Hill, N.J.

[21] Appl. No.: 08/846,016

[22] Filed: Apr. 25, 1997

[51] Int. Cl.$^6$ ...................................................... G06F 11/00
[52] U.S. Cl. ............................... 395/187.01; 395/200.59; 395/200.49
[58] Field of Search ............................... 395/187.01, 186, 395/182.02, 188.01, 200.58, 200.33, 200.59, 200.42, 200.46, 200.56, 200.74, 200.49

[56] References Cited

U.S. PATENT DOCUMENTS

| | | | |
|---|---|---|---|
| 5,572,643 | 11/1996 | Judson | 395/155 |
| 5,586,260 | 12/1996 | Hu | 395/200.2 |
| 5,649,099 | 7/1997 | Theimer et al. | 395/187.01 |
| 5,682,478 | 10/1997 | Watson et al. | 395/200.12 |
| 5,684,951 | 11/1997 | Goldman et al. | 395/188.01 |

OTHER PUBLICATIONS

"Shared Mosaic," http://www.eit.com/goodies/software/share_mosaic/sh–mosaic.html, Ver. 2.pre2, p. 1.
"Usage for Shared Mosaic," http://www.eit.com/goodies/software/share_mosaic/shared–mosaic–usage.html, p. 1.
"Shared Mosaic Features," http://www.eit.com/goodies/software/share_mosaic/shared–mosaic–features.html, Ver. 2.pre2, p. 1.
"Shared Mosaic TODO List," http://www.eit.com/goodies/software/share_mosaic/shared–mosaic–todo.html, Ver.2.pre2, p. 1.
"Look@Me A Timbuktu Applet with Netscape Plug–in," http://collaborate.farallon.com/www/look/ldownload.html, pp. 1 & 2.
"EMSL Collaborative Research Environment (CORE)," http://www.emsl.pnl.gov:2080/docs/tour/index.html, pp. 1 & 2.

*Primary Examiner*—Albert DeLady
*Assistant Examiner*—Pierre Eddy Elisea

[57] ABSTRACT

Using a server system in accordance with the invention, a user and his/her companions can share information on the World Wide Web (WWW). The server system allocates a memory space for storing information particular to the user. This user memory space is associated with the user's login identification (ID) provided to the server system during the user login. Web information obtained by the user from the server system, or a representation of such information, is stored in the user memory space. In sharing the web information, the user's companions need to log onto the server system separately using the user's login ID. The server system then provides the companions with the web information based on the information currently stored in the memory space associated with the user's login ID provided by the companions.

57 Claims, 3 Drawing Sheets

TECHNIQUE FOR SHARING INFORMATION ON WORLD WIDE WEB

FIELD OF THE INVENTION

The invention relates to communications systems and methods, and in particular to systems and methods for allowing users to share information on the World Wide Web (WWW) or the "web".

BACKGROUND OF THE INVENTION

Computer users can access many information resources on an expansive international network of computer networks known as the Internet. The WWW is a graphical subnetwork of the Internet. With standard "web browser" software such as the NETSCAPE NAVIGATOR and INTERNET EXPLORER browsers, the users can readily access Internet information and services provided by web servers on the WWW.

Many Internet services allow communications between users. For example, two or more computer users may access a designated web server providing a "text-chat" service, whereby users may interactively communicate in text with one another in real time.

In addition, computer users can share a web browsing experience using a SHARED MOSAIC browser. To that end, each user is required to have his/her own copy of the SHARED MOSAIC software on a computer. To establish links between a user and his/her companions, the user needs to communicate to the companions beforehand by, say, email or telephone an internet protocol (IP) port number identifying the user's particular browser. The companions then run the respective browsers on their computers and enter the IP port number as communicated, thereby establishing the links between the user's computer and the companions' computers through the Internet. As the user is visiting a website of interest, he/she can select an option provided by the browser to share with the companions the same information from the website through the established links.

Other well-known ways of sharing a web browsing experience include, for example, use of a NETSCAPE plugin which requires specialized plugin software to be installed with a NETSCAPE NAVIGATOR browser.

SUMMARY OF THE INVENTION

While the NETSCAPE plugin or SHARED MOSAIC type arrangement is desirable in that a user and his/her companions can share the same web information in real time, an aspect of its application has been recognized by us to be disadvantageous. In particular, each of the user and companions need to have the same specialized software (e.g., the plugin software or SHARED MOSAIC browser) in order to take advantage of the prior art arrangement.

The present invention, however, solves the above-identified problem. In accordance with the invention, when a server system provides data to a user computer running standard web browser software, it stores a representation of the data in a memory space associated with an indicator, e.g., the user's login ID, which is indicative of the user or the user computer. When the user wants to share data with one or more of his/her companions, each companion needs to log onto the server system using a separate computer, and provide the system with the indicator. The companion computer also runs standard web browser software, which may or may not be same as that on the user computer. Once the companion logs onto the system, the companion is afforded by the system an option to issue a request for sharing the user data. This request incorporates the indicator provided by the companion. In response to such a request, the system generates the user data based on its representation stored in the memory space associated with the indicator. The companion computer is then provided with the generated data, thereby sharing the user data.

BRIEF DESCRIPTION OF THE DRAWING

The present invention will be more fully appreciated by consideration of the following detailed description, when read in light of the accompanying drawing in which.

DETAILED DESCRIPTION

Figure 1:
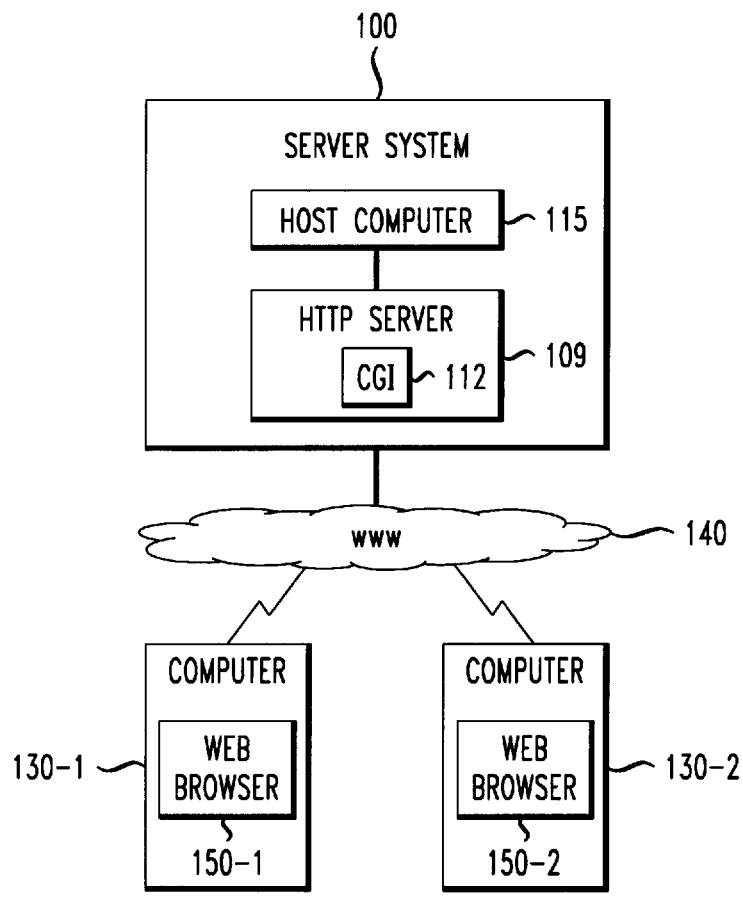
FIG. 1 illustrates a communications arrangement embodying the principles of the invention wherein a server system on the WWW allows users to share information.

FIG. 1 illustrates a communications arrangement embodying the principles of the invention wherein server system 100 provides information and services over a communication network. In this particular illustrative embodiment, server system 100 provides a map related service via World Wide Web (WWW) 140, whereby a user may obtain map related information and share same with one or more of his/her companions in a manner to be described. System 100 works compatibly with standard web browsers such as the NETSCAPE NAVIGATOR and INTERNET EXPLORER browsers, the standard hypertext transfer protocol (HTTP) and hypertext markup language (HTML).

As shown in FIG. 1, a user may utilize computer 130-1 to access system 100 over WWW 140 at a predetermined uniform resource locator (URL). Computer 130-1 may be a conventional personal computer (PC) running standard web browser 150-1. In accessing system 100, browser 150-1 establishes a connection to HTTP server 109 having common gateway interface (CGI) 112. CGI 112 includes programs which define certain functions of server 109 described hereinbelow.

Figure 2:
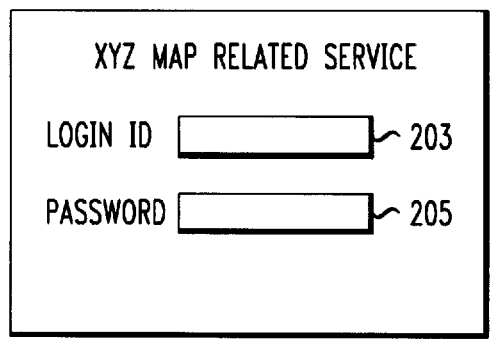
FIG. 2 illustrates a home page provided by the server system in accordance with the invention.

As soon as the connection between browser 150-1 and server 109 is established, server 109 in a well-known manner causes a "login" web page to be displayed on computer 130-1. FIG. 2 illustrates such a login page, which in this instance identifies the service provided by server system 100, namely, an "XYZ map related service." In addition, the user is prompted to enter into boxes 203 and 205 a login identification (ID) and password, respectively. The login ID and password are pre-selected by the user during a prior registration, and their copies are stored in host computer 115.

The login ID and password entries are transmitted by browser 150-1 to HTTP server 109 for verification thereof. Specifically, server 109 checks the entries against the stored copies in computer 115. In a conventional manner, if the login ID and/or password is invalid, the user is afforded a predetermined number of additional times to enter the correct ID and password before he/she is denied access to system 100. Otherwise, if server 109 determines that the login ID and password are valid, it allocates a memory space in host computer 115 for storing information particular to the user. This user memory space is associated with the user's login ID. In addition, server 109 retrieves from host computer 115 information representing a "welcome" web page.

Figure 3:
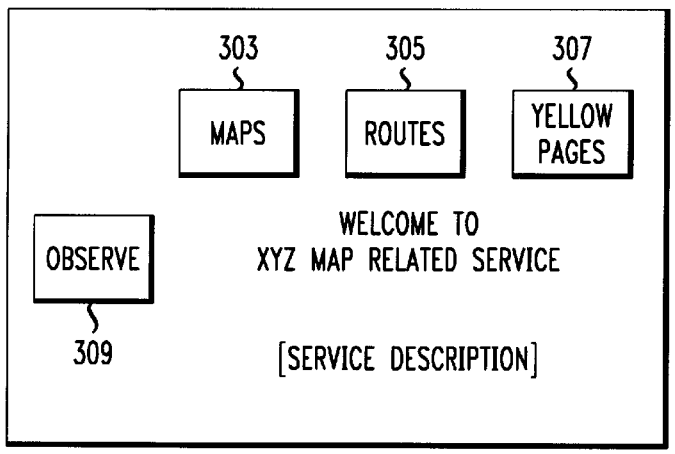
FIG. 3 illustrates a first web page provided by the server system.

Based on the retrieved information, server 109 generates an HTML document representing the welcome page and transmits same to browser 150-1. Upon opening this document, browser 150-1 causes computer 130-1 to display thereon the welcome page. FIG. 3 illustrates such a page, which includes a greeting such as "Welcome to XYZ map related service," followed by a description of the subject service. The welcome page also provides displayed options, namely, MAPS option 303, ROUTES option 305, YELLOW PAGES option 307, and OBSERVE option 309. In a conventional manner, the user can select any one of the options by pointing and clicking at the option using a mouse device or similar indicator device (not shown).

In this instance, selection of MAPS option 303 enables the user to invoke a map centered on a specified street or city. Selection of ROUTES option 305 enables the user to plan a route for a trip. Selection of YELLOW PAGES option 307 enables the user to search YELLOW PAGES type information by category and by distance. For example, the search enables the user to locate gas stations and restaurants within a predetermined distance of the planned route, or in the area shown on the invoked map. OBSERVE option 309 allows sharing of information between the user and one or more of his/her companions in accordance with the invention, and is fully described hereinbelow.

Figure 4:
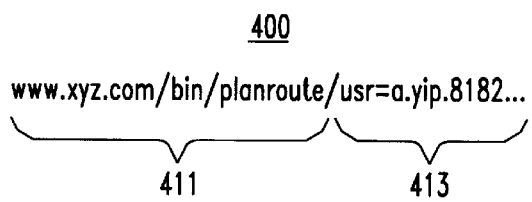
FIG. 4 illustrates a uniform resource locator (URL) represented by a displayed option in accordance with the invention.

Each displayed option on the welcome page represents a respective URL, which comprises a web link information portion and an argument portion. The web link information portion identifies a hyperlink leading to a web page. The argument portion includes information identifying the user such as the login ID obtained by system 100 during the user login. FIG. 4 illustrates URL 400 represented by ROUTES option 303. As shown in FIG. 4, URL 400 includes web link information portion 411, i.e., www.xyz.com/bin/ planroute/, which represents a hyperlink to a "planroute" web page to be described. In addition, it includes argument portion 413 incorporating the user's login ID, which in this instance is "a.yip.8182". Argument portion 413 may also include other information such as a session ID identifying the current session. This session ID may correspond to the password entry by the user. In that case, the session ID may be used by system 100 in lieu of the password for security purposes.

Furthermore, the URL represented by MAPS option 303 includes "www.xyz.com/bin/map/" representing a hyperlink to a "map" web page, and an argument portion similar to portion 413. The URL represented by YELLOW PAGES option 307 includes "www.xyz.com/bin/yellowpages/" representing a hyperlink to a "yellowpages" web page, and an argument portion also similar to portion 413.

In this example, the user wants to utilize the XYZ map related service to plan a route for an upcoming trip. Thus, the user in this instance selects ROUTES option 305 on the welcome page of FIG. 3 by pointing and clicking at the option. In response, browser 150-1 causes URL 400 to be transmitted to HTTP server 109. Upon receipt of URL 400, HTTP server 109 identifies the hyperlink to the planroute page in portion 411 of the URL, and the user ID in portion 413 thereof. In response, HTTP server 109 retrieves from host computer 115 information representing the planroute page to be sent to browser 150-1. In addition, HTTP server 109 starts storing, in the user memory space, the state information necessary to re-generate the web page. This state information includes information indicative of the web page, internal format information associated with the page, and information to be entered by the user on the page. HTTP server 109 then transmits an HTML document representing the planroute page to browser 150-1.

Figure 5:
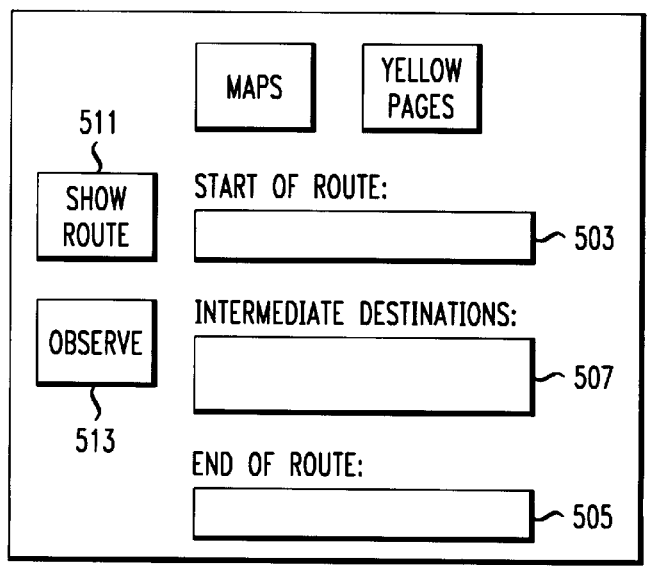
FIG. 5 illustrates a second web page provided by the server system.

Upon opening the received HTML document, browser 150-1 causes the planroute page to be displayed on computer 130-1. FIG. 5 illustrates such a page. On this page, the user is prompted to enter into boxes 503, 505 and 507 the start address of the route that the user is planning, the end address thereof, and any intermediate destinations, respectively. In addition, SHOW ROUTE option 511 and OBSERVE option 513 are presented on the present page, along with a MAPS option and YELLOW PAGES option previously described.

It should be noted at this juncture that, in accordance with the invention, the URL represented by an OBSERVE option (such as OBSERVE option 513 or 309) includes an argument portion similar to portion 413, and a web link information portion—www.xyz.com/bin/mostrecent/—representing a hyperlink to the web page whose state information was most recently stored in the memory space associated with the login ID, which appears in the argument portion. As described hereinbelow, the OBSERVE option is intended for selection by a companion of the user separately accessing system 100 using, say, computer 130-2. It suffices to know for now that when the companion selects such an option, HTTP server 109 retrieves the most recent state information from the user memory space to re-generate the web page currently shown on computer 130-1, and transmits same to computer 130-2. As a result, the user and the companion manage to share the same information in accordance with the invention.

Continuing the above example, the user in this instance enters the start and end addresses of the route being planned into respective boxes 503 and 505, without intermediate destinations. The address entries are then transmitted by browser 150-1 to HTTP server 109. The latter stores the received entries in the user memory space in computer 115.

After entering the above addresses, the user selects SHOW ROUTE option 511 to view the resulting route. Option 511 represents another URL which again includes the user's login ID in the argument portion thereof. Browser 150-1 then transmits the URL to HTTP server 109 for processing. Upon receiving such a URL, server 109 retrieves from the memory space associated with the user's login ID the previous address entries, and other information in host computer 115 to generate an HTML document representing a "route" page. Before transmitting the document to browser 150-1, HTTP server 109 again stores the state information necessary to re-generate the route page to be sent in the user memory space.

Figure 6:
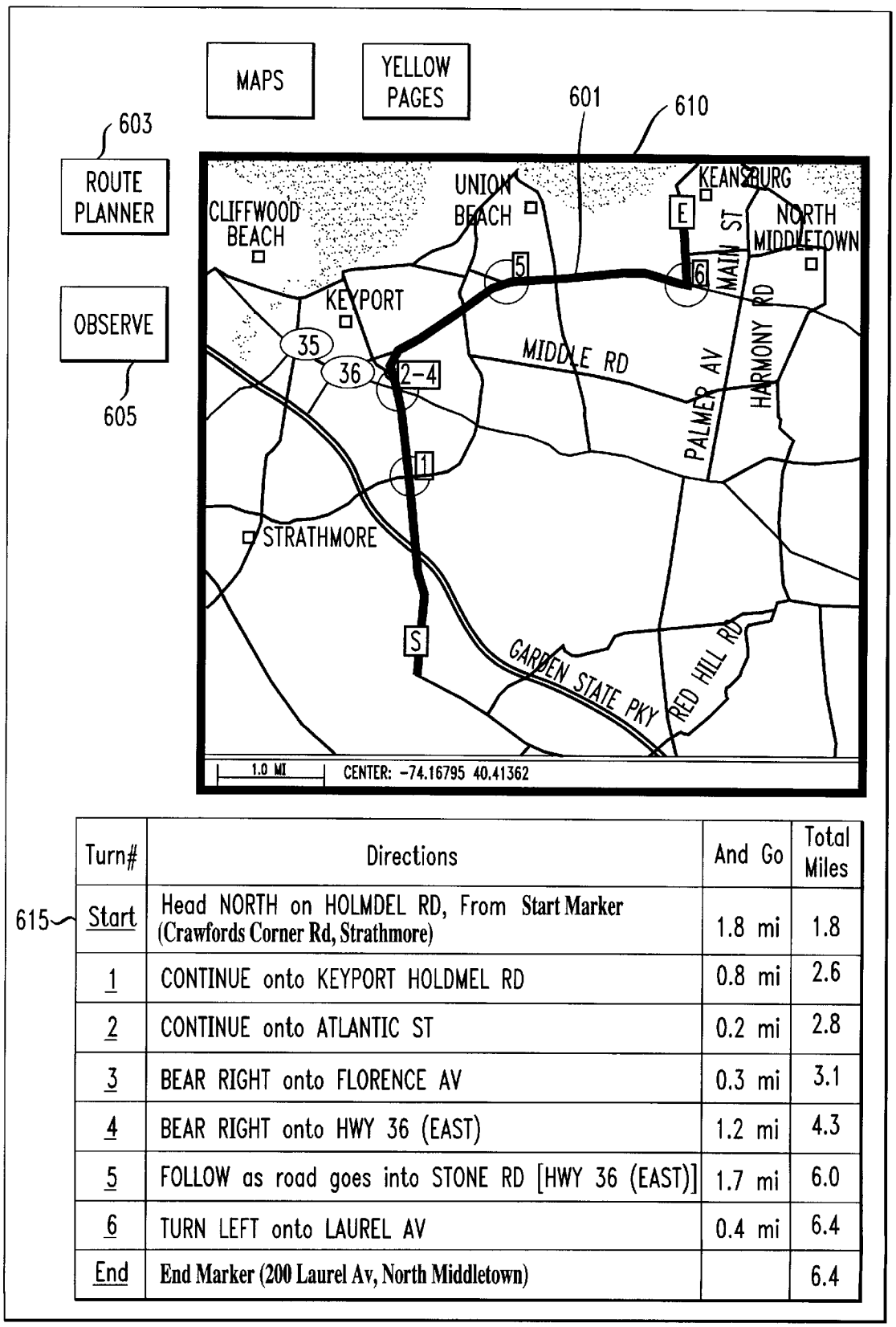
FIG. 6 illustrates a third web page provided by the server system.

FIG. 6 illustrates the route page on computer 130-1 after browser 150-1 opens the HTML document received from server 109. As shown in FIG. 6, the fastest route (denoted 601) by automobile between the start address (denoted S) and the end address (denoted E) is indicated on map 610. The turns along route 601 are numerically denoted 1 through 6, and explained in detail in table 615 referring to such numerals.

The route page also provides ROUTE PLANNER option 603 and OBSERVE option 605, along with the MAPS and YELLOW PAGES options previously described. ROUTE PLANNER option 603 can be selected to plan another route. As further described hereinbelow, selection of OBSERVE option 605 enables the selector to share the information of which his/her counterpart is in possession. Other functions provided by the route page such as scaling, panning and zooming functions involving map 610 are deemed to be out of the scope of the present invention, and their description is thus omitted here.

In furtherance of the above example, the user at this point wants to share the route page with a companion to discuss route 601 for the upcoming trip. To that end, the user communicates his/her login ID and password to the companion through a secondary communication means such as telephone, facsimile, text-chat, or Internet phone. Upon learning the information from the user, the companion accesses server system 100 at the predetermined URL using computer 130-2 in FIG. 1, which is equipped with standard web browser 150-2. Like the user, the companion is first presented with the login page of FIG. 2. The companion then logs onto the system with the user's login ID and password. Accordingly, the welcome page of FIG. 3 appears on computer 130-2.

In accordance with the invention, the companion selects OBSERVE option 309 on the welcome page to obtain the same information as the user. Browser 150-2 then transmits the URL represented by option 309 to HTTP server 109. As described before, the web link information portion of such a URL represents a hyperlink to the web page whose state information was most recently stored in the memory space associated with the login ID appearing in the argument portion thereof. Since the companion logged onto system 100 using the user's login ID, in response to the received URL, HTTP server 109 retrieves from the user memory space the state information most recently stored therein. At this point, such state information corresponds to the route page of FIG. 6 currently shown on computer 130-1. Based on the retrieved state information, HTTP server 109 re-generates the route page in HTML, and transmits same to browser 150-2. Accordingly, browser 150-2 causes the route page to be displayed on computer 130-2 as well. As a result, the user and his/her companion manage to share the same web information, i.e., the route page of FIG. 6.

With the same route page before them, the user and the companion can now efficiently discuss the upcoming trip involving route 601 through the established secondary communication means, e.g., telephone connection. If at this point the user selects one of the options, say, ROUTE PLANNER option 603 on the route page to plan another route, thereby invoking a new web page on computer 130-1, the state information corresponding to the new page is accordingly stored in the user memory space and becomes the most recent state information. If the user asks the companion to update computer 130-2 to share the new information, the companion needs to select OBSERVE option 605 on the route page currently shown on computer 130-2. As a result, HTTP server 109 re-generates the new page for showing on computer 130-2 based on the most recent state information.

The information sharing between the user and companion can continue through exchanges similar to the above. However, it should be noted that system 100 does not distinguish the user from the companion as they both use the same login ID in the information sharing process. As such, the user and companion enjoy the same status during the process. That is, the companion at any time can take the initiative to go to a new page, followed by the user selecting an OBSERVE option on the current page, and vice versa.

In addition, other companions can also log onto system 100 separately using the user's login ID and password to share the same information. In that case, for the reasons set forth above, each companion enjoys the same status as the user during the information sharing process.

The foregoing merely illustrates the principles of the invention. It will thus be appreciated that a person skilled in the art will be able to devise numerous other arrangements which embody the principles of the invention and are thus within its spirit and scope.

For example, system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Server apparatus for providing information to at least a first receiver and a second receiver comprising:

a controller for providing to said first receiver for selection an option to issue a request for obtaining said information, said information being provided to said second receiver, said request including an indicator indicative of said second receiver; and a processor responsive to said request for generating said information based on a representation thereof, said representation being stored in a memory space associated with said indicator.

2. The apparatus of claim 1 wherein said information is provided to said receiver over a communication network.

3. The apparatus of claim 2 wherein said communication network includes at least a portion of a World Wide Web (WWW).

4. The apparatus of claim 3 wherein said information includes a web page.

5. The apparatus of claim 4 wherein said representation includes format data associated with said web page.

6. The apparatus of claim 1 wherein said indicator includes a login identification (ID).

7. The apparatus of claim 1 wherein said processor includes said controller.

8. The apparatus of claim 1 wherein said receiver includes a computer.

9. The apparatus of claim 1 wherein said receiver includes a web browser.

10. Server apparatus comprising:

a first interface for receiving, from a first source, a first request for information and, from a second source, a second request for sharing said information, said second request including an indicator indicative of said first source;

a second interface responsive to said first request for providing said information; and a processor responsive to said second request for generating said information based on a representation thereof, said representation being stored in a memory space associated with said indicator.

11. The apparatus of claim 10 wherein said first interface receives at least one of said first request and said second request from a communication network.

12. The apparatus of claim 11 wherein said communication network includes at least a portion of a WWW.

13. The apparatus of claim 12 wherein said first request includes a hyperlink to a web page which includes said information.

14. The apparatus of claim 13 wherein said representation includes format data associated with said web page.

15. The apparatus of claim 10 wherein said representation includes data provided by said first source.

16. The apparatus of claim 10 wherein said indicator includes a login ID.

17. The apparatus of claim 10 wherein said first interface is the same as said second interface.

18. A server system comprising:

means for receiving, from a first source, a first request for information and, from a second source, a second request for sharing said information;

means responsive to said first request for providing said information;

a memory space for storing a representation of said information; and means responsive to said second request for generating said information based on the stored representation, the generating means including means for associating said memory space with an indicator in said second request, said indicator being indicative of said first source.

19. The system of claim 18 wherein at least one of said first request and said second request is received over a communication network.

20. The system of claim 19 wherein said communication network includes at least a portion of a WWW.

21. The system of claim 20 wherein said first request includes a uniform resource locator (URL).

22. The system of claim 20 wherein said information includes a web page, and said representation includes format data associated with said web page.

23. The system of claim 18 wherein said representation includes data provided by said first source.

24. The system of claim 18 wherein said information is map related.

25. The system of claim 18 wherein said indicator includes an ID for logging onto said system.

26. A system for providing information to at least a first receiver and a second receiver for concurrent viewing of said information comprising:

a server for serving said information to the first receiver;

a memory space for storing a representation of said information, said memory space being associated with an indicator, said indicator indicative of said first receiver, said server receiving from the second receiver a request for sharing said information, said request including said indicator; and a processor responsive to said request for generating said information based on the stored representation, said server serving the generated information to said second receiver.

27. The system of claim 26 wherein at least one of said first and second receivers includes a computer.

28. The system of claim 26 wherein said server serves said information to said first receiver over a communication network.

29. The system of claim 28 wherein said communication network includes at least a portion of a WWW.

30. The system of claim 29 wherein at least one of said first and second receivers includes a web browser.

31. The system of claim 29 wherein said information includes a web page.

32. The system of claim 31 wherein said representation includes format data associated with said web page.

33. The system of claim 26 wherein said representation includes data provided by said first receiver.

34. The system of claim 29 wherein said request is in the form of a URL.

35. The system of claim 26 wherein said indicator includes an ID for logging onto said system.

36. The system of claim 26 wherein said processor includes said server and said memory space.

37. A method for providing information to at least a first receiver and a second receiver comprising the steps of:

providing to said first receiver for selection an option to issue a request for obtaining said information, said information being provided to said second receiver, said request including an indicator indicative of said second receiver; and generating said information based on a representation thereof in response to said request, said representation being stored in a memory space associated with said indicator.

38. The method of claim 37 wherein said information includes a web page.

39. The method of claim 38 wherein said representation includes format data associated with said web page.

40. The method of claim 37 wherein said indicator includes a login ID.

41. A method for use in a server apparatus having at least a memory space comprising the steps of:

receiving, from a first source, a first request for information and, from a second source, a second request for sharing said information, said second request including an indicator indicative of said first source;

providing said information in response to said first request; and generating said information based on a representation thereof in response to said second request, said representation being stored in said memory space identified by said indicator.

42. The method of claim 41 wherein said first request includes a hyperlink to a web page which includes said information.

43. The method of claim 42 wherein said representation includes format data associated with said web page.

44. The method of claim 41 wherein said representation includes data provided by said first source.

45. The method of claim 41 wherein said indicator includes a login ID.

46. A method for use in a server system having at least a memory space comprising the steps of:

receiving, from a first source, a first request for information and, from a second source, a second request for sharing said information;

providing said information in response to said first request;

storing a representation of said information in the memory space; and generating said information based on the stored representation in response to said second request, the generating step including the step of associating the memory space with an indicator in said second request, said indicator being indicative of said first source.

47. The method of claim 46 wherein said first request includes a URL.

48. The method of claim 46 wherein said information includes a web page, and said representation includes format data associated with said web page.

49. The method of claim 46 wherein said representation includes data provided by said first source.

50. The method of claim 46 wherein said information is map related.

51. The method of claim 46 wherein said indicator includes an ID for logging onto said system.

52. A method for providing information to at least a first receiver and a second receiver for concurrent viewing of said information comprising the steps of:

serving said information to the first receiver;

storing a representation of said information according to an indicator, said indicator indicative of said first receiver;

receiving, from the second receiver, a request for sharing said information, said request including said indicator;

generating said information based on the stored representation in response to said request; and serving the generated information to said second receiver.

53. The method of claim 52 wherein said information includes a web page.

54. The method of claim 53 wherein said representation includes format data associated with said web page.

55. The method of claim 52 wherein said representation includes data provided by said first receiver.

56. The method of claim 52 wherein said request is in the form of a URL.

57. The method of claim 52 wherein said indicator includes a login ID.

* * * * *